June 9, 1953  G. TOMMASI  2,641,711
PHOTOCELL SENSITIVE TO ELECTROMAGNETIC RADIATIONS
Filed March 8, 1949  3 Sheets-Sheet 1

INVENTOR
GIOVANNI TOMMASI

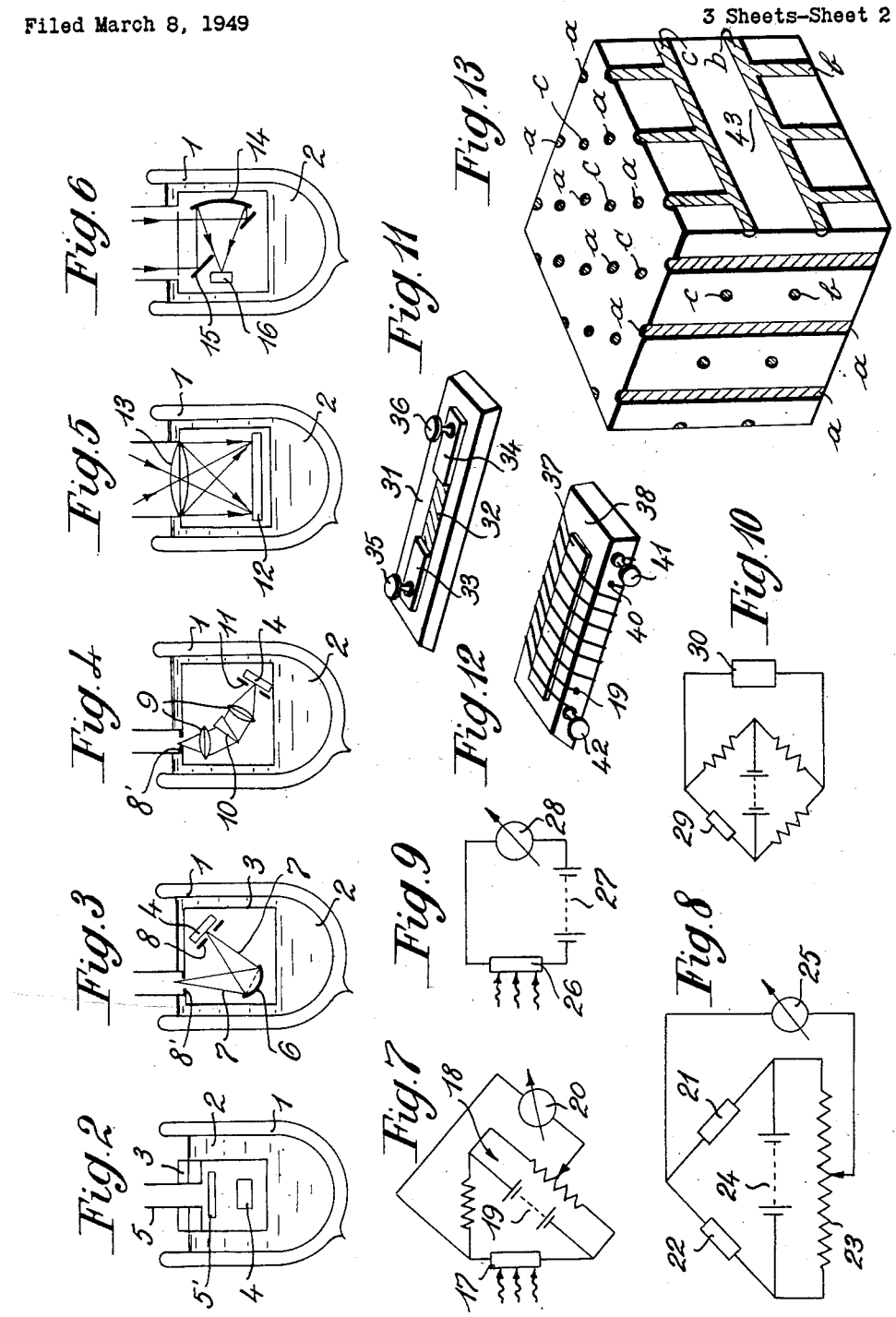

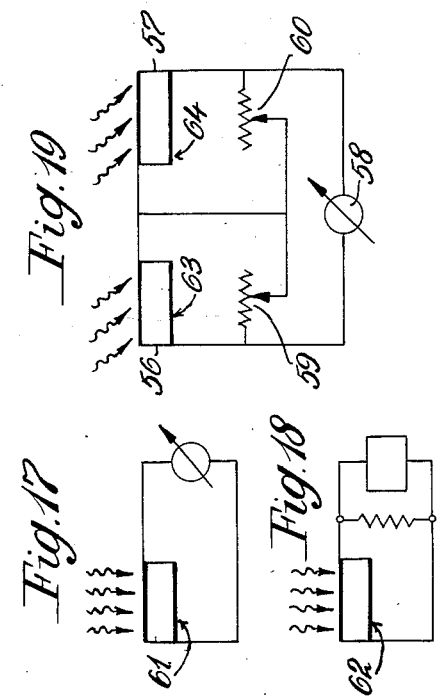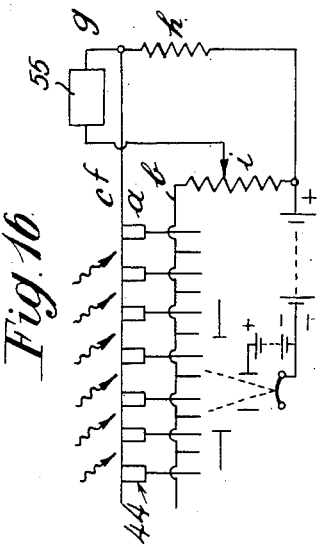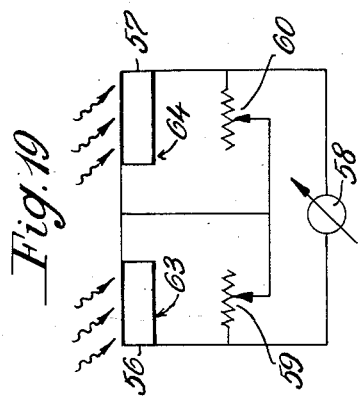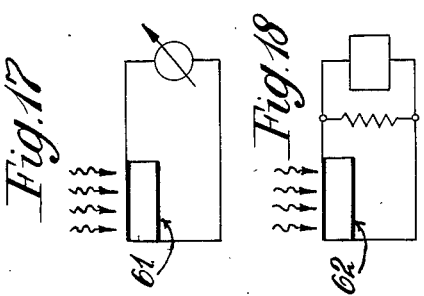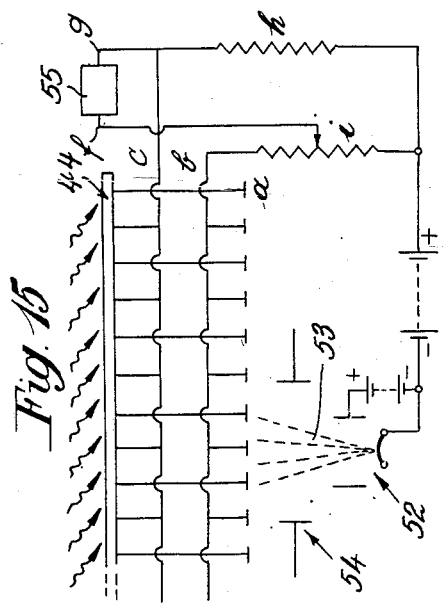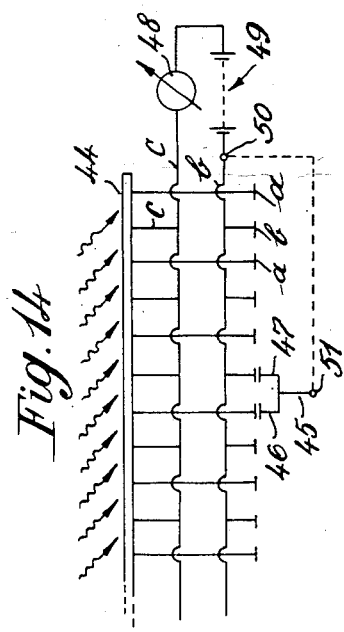

Patented June 9, 1953

2,641,711

UNITED STATES PATENT OFFICE 2,641,711

PHOTOCELL SENSITIVE TO ELECTRO-MAGNETIC RADIATIONS

Giovanni Tommasi, Rome, Italy

Application March 8, 1949, Serial No. 80,248
In Italy January 14, 1949

19 Claims. (Cl. 250—83.3)

My invention relates to a cell sensitive to the electromagnetical radiations having a wavelength of more than 6 micron.

I will examine herebelow the characterisation of the substances suitable to detect the aforesaid electromagnetical radiations and some forms of embodiment of the cell which utilises said substances.

I have tested many substances in order to determine which of them are suitable to give the best results, proceeding as under an internal photoelectric effect, after a total screening against radiations of the medium, obtained by means of suitable opaque substances cooled at a convenient temperature.

Having explored the whole field of temperatures comprised between that of ebullition of the oxygen and the room temperature, I have found that, in agreement with the present technical and scientific art, the substances having a metallic conductivity, which in this field of temperatures present an increase of their conductivity corresponding to the decrease of temperature, are not sensitive to the incidence of the electromagnetic thermic and infrared radiations.

I have located by tests a class of substances which comprises metalloids and mixtures or semiconductive chemical compounds of metals and metalloids which have, all, a particular feature which will be specified hereafter. Said substances possess an electric sensitivity to the thermic radiations of the medium, which renders them suitable for practical uses as detectors of thermic radiations, for instance for the scientific or technical spectroscopy, or for the use in apparatus suitable to detect the radiations emitted by the medium on the thermic lengths of wave, so as to reconstruct an image which consents the visibility under any condition, i. e. at night or through fog, without having to use any artificial means of illumination or projectors.

Obviously, the detective substances have to be placed in active conditions, that is they have to be screened against the radiations emanating from the surrounding medium and cooled at a temperature for which, owing to the rule of Plank and Wien, their thermic state will not produce stationary electromagnetic stresses in the substance or in its surroundings, such as to excite or saturate the sensitivity of the substance or superpose to the radiations to be detected and measured.

Said substances must also be fitted in an electric or electronic circuit suitable to detect the alterations produced by the radiation and particularly their thickness must be in relationship with the respective transparence to the radiations to detect.

Under these circumstances the substances may be used separately as detective cells or inserted in a protected and cooled unit suitable to reveal more complex images or thermic or radiative phenomena.

I will describe hereafter what the fitting of the cell and its application will be.

The feature which indicates and distinguishes the substances suitable to the desired scope is a property identified and identifiable with ordinary testing methods, property which is the characteristic of their suitability to their use in these applications. Particularly, the suitable substances are those which in the field of temperatures below that of the medium, for instance of 37° C. as a maximum, possess a conductivity increasing with the increase of temperature for a greater or lesser period, i. e. a variation in a direction contrary to that of the common metallic conductors.

An example of characterisation of these substances in respect of the invention and some forms of embodiment of the cell sensitive to the electromagnetic radiations having a wavelength of more than 6 micron, which uses said substances, are shown in the attached sheets of drawings where:

Figs. 2 to 6 shows schematically, the thermic and optic fitting of the cell for various uses;

Figs. 7 to 10 show schematically some diagrams of electric fitting of the cell;

Figs. 11 and 12 show the mechanical fitting of the detective substance;

Fig. 13 shows a preferred form of embodiment of the substance support;

Figs. 14 to 16 show schematically the electric assemblies and the dispositions of use and of mechanic and electronic commutation of cells for complex detections, and Figs. 17, 18 and 19 show the case in which the cell is used for detecting an electromotive force produced by the radiation.

With reference to the drawings:

Figure 1:
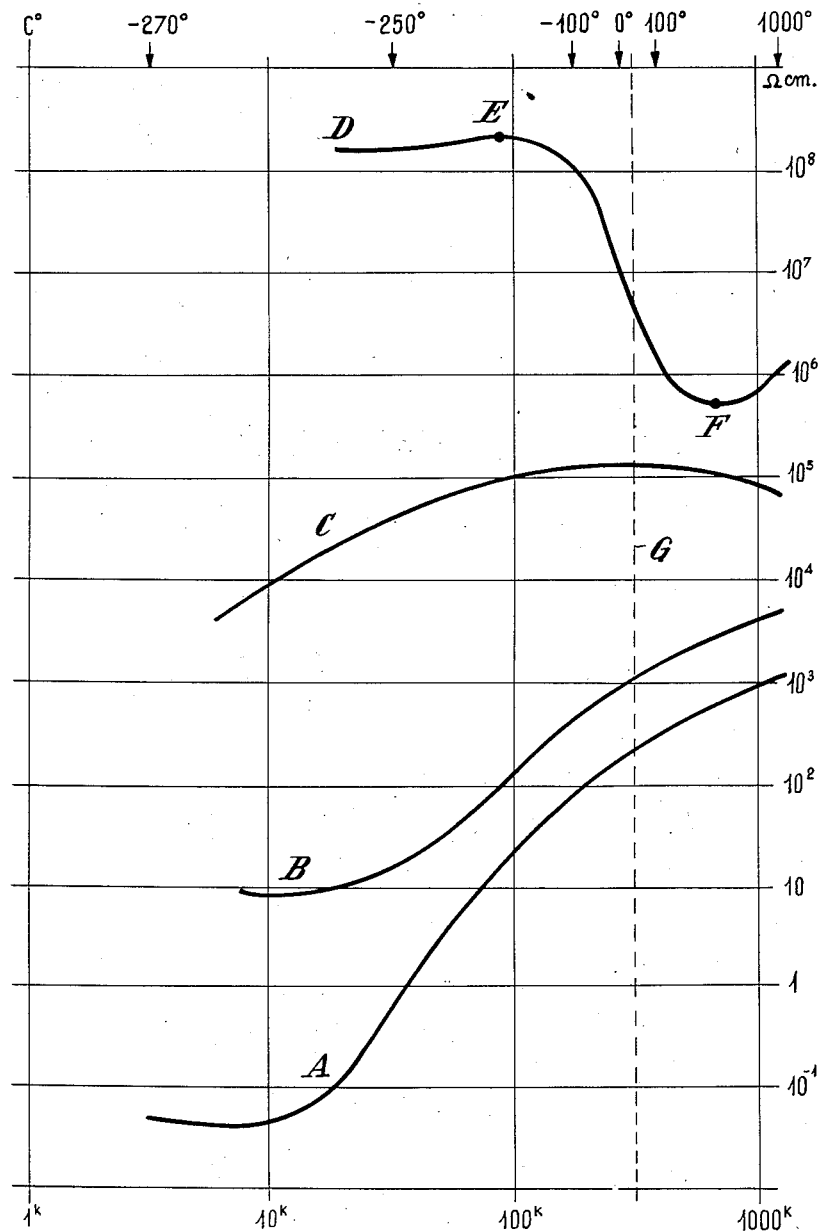
Fig. 1 is a diagram showing some characteristic curves, concerning different substances.

An example of characterisation of the substances relating to the invention is shown by Fig. 1 which represents a diagram in logarithmical scale on the abscissae of which are marked: below, the temperatures in Kelvin degrees and above, the temperatures in centigrades. On ordinates is marked in logarithmical scale the resistivity in ohm. cm.

In the drawing are marked by way of example the approximate curves of two typically metallic conductors; by A is indicated the curve relating to the iron, and by B the curve relating to the copper; by C is marked the curve of a metalloid in one of its conductive alterations which does not present the above specified feature (graphite). The vertical dotted straight line G indicates the room temperature.

The curve D indicates, merely by way of example, the turn of the curve of conductivity which characterises the sensitive substances to be used in the cell according to the invention; particularly the zone comprised between point E, of maximum, and F, of minimum, is the zone which shows the sensitivity of the substance.

Obviously, the zone similar to the zone E—F may be in a different position, displaced in all the field of temperatures and conductivities, according to the substance considered.

Particularly, when the sensitive zone of the type E—F falls in the field of temperatures below the temperature of the medium, this fact indicates that the substance under examination is sensitive to the radiations having a wavelength minor than the thermic radiations of the natural medium.

The steepness of the curve, which is characteristic of any substance, and the positions of the maximum E and of the minimum F show in their turn and respectively the degree of sensitivity and the field of the wavelengths of the electromagnetic radiations to which the substance is electrically sensitive.

It is fundamental to point out, as shown by the drawing, that the described phenomenon is perfectly contrary to that known for the substances having metallic conductivity, and it is characteristic and sufficient in order to identify the sensitive substances suitable to the foreseen applications, inasmuch as the conductivity of metallic type is obtained in that part of the curve which from point F goes towards the higher temperatures.

By way of example it is noted that the aforesaid properties are met with in the black phosphorus, in the silicon, in the cupric oxide and cuprous oxide for temperatures higher than that of the medium.

In the iodine, in the boron, in the iron sulfide, in some alloys of arsenic and tin and in other binary or multiple chemical compounds, which at the temperature of the medium have semiconductive character, the sensitive zone is on the contrary below the room temperature.

The elements or compounds afore listed react to the radiation of electromagnetic waves having a length of more than 6 micron, either through a variation of their conductivity, or through the generation of an electromotive force, according to how they are hit by the radiation, without difference from what occurs to the substances sensitive to the radiations shorter than the thermic ones, already known for their internal photoelectric activity, as the cuprous oxide and selenium.

The substances of the class so determined may therefore, according to the radiation to be detected and to their fitting, act as a barrage layer, or as source of electromotive force or at least as cell having a variation of its conductivity; as these effects are only known applications in other fields of the same physical property which according to the present invention, is used for the detection and the measure of electromagnetic radiations having wavelengths over 6 micron.

As for the optical and thermic fitting, the substance is placed on the path of the electromagnetical rays to detect.

All the optical means, known per se, i. e. light filters, shields, mirrors, lenses, reticula, prisms, up to the inlet opening comprised (spectroscopic opening), must be cooled at the same temperature of the substance and of its support.

Furthermore, the walls of the apparatus containing the optical means and the sensitive substance must be opaque to the radiations to be detected and also must be cooled.

The organs which must not transmit the radiations to detect, must be covered by substances which absorb the radiations.

The sensitive substance, in its turn, must be protected from the parasite radiations or from the ones external to the interested field by means of opaque shields cooled and covered by absorbing substance.

The cooling must be accomplished by means of a liquid or solid, point of evaporation of which, at working pressure, is lower than the room temperature.

For instance, at atmospherical pressure: $CO_2$, $O_2$, $N_2$, $H_2$, He, Figs. 2 to 6 show as aforesaid, some diagrammatical forms of embodiment.

Particularly, Fig. 2 shows the case of a cell employed for the simple detection. There is a Dewar vase 1 containing the liquid air 2, in which is immersed the container schematically indicated by 3 which contains the cell 4 and forms the cold chamber. Facing the cell is the conduct of arrival of the rays which must hit the cell 5; on the path of the rays is interposed a filter 5' which is also cooled.

Figs. 3 and 4 show, also schematically, two types of fitting for spectroscopic analysis.

In this case also, by 1 is indicated the Dewar vase containing the liquid air 2 in which is immerged the casing 3 of the cell. On the path of the rays is interposed the spectroscopical opening 8'.

The cell has been indicated in this case also, by the reference 4 and in Fig. 3 is shown by 6 a specular reticulus intended to reflect towards the cell 4 the radiations indicated by 7.

In front of the cell there is an opaque shield 8 provided with an opening.

Another system intended to obtain the same results is shown by Fig. 4 in which instead of a specular reticulus, between the inlet of the rays into the casing of the cell and the opening 11 which is placed in front of the same cell, are placed two lenses 9 and a prism 10, intended to deviate the path of the rays in order to reproduce on the shield 11 the spectroscopic image of the inlet opening 8'.

Figs. 5 and 6 show diagrams of use for panoramic views. Particularly, in Fig. 5, the rays are directly concentrated on the cell 12, by the lens 13 being the cell contained in a casing immerged in the cooling element contained in the Dewar vase.

Fig. 6 shows the case where the rays are concentrated by the concave mirror 14 after having been reflected by the mirror 15 and concentrated on the cell 16 through an opening made in the very mirror.

As for the electric fitting, it is to be observed that the substances which possess the curve of conductivity of the aforesaid form, once cooled work differently according to how they are hit by the radiation.

The thickness of the sensitive layer is preferably uniform all over the cell, even if roughly.

If the substance is hit uniformly (also internally) by the radiation, its conductivity is modified but electromotive forces do not arise. This is verified when the hit layer has a thickness of the same size of the wavelength of the radiation to detect, and in any case when it has a thickness such as to be fully penetrated by the radiation.

In this case, the conductivity of the layer of substance hit by the radiation is electrically registered.

If the substance is used in order to determine the intensity of a given radiation, it is necessary that the substance be hit uniformly all over the surface connected electrically.

The electric fitting of the substance, shown in Fig. 7, may be embodied on an ordinary resistance testing bridge.

In this figure, is indicated by 17 the cell, by 18 the bridge unit fed by the direct current source 19 and by 20 the testing galvanometer.

The direct current source may be substituted by a source of alternate current and the galvanometer by a microphone or an amplifier.

If the cell is used to test the intensities of two radiations, the diagram shown by Fig. 8 indicates how the fitting must be provided on a testing bridge. In said figure the two cells are indicated by 21 and 22, the variable resistance by 23, the source of direct current by 24 and the galvanometer by 25.

In this case also, the source of direct current may be substituted by a source of alternative current and the galvanometer by a microphone or an amplifier.

If it is desired to register the variation of the flux of radiation in the course of time, the fitting in series of the cell on a source of electric power is sufficient, as shown by Fig. 9, where: by 26 is indicated the cell, by 27 the source of current, by 28 the galvanometer. Obviously, in this case also is repeated the possibility of employing the alternate current by the means indicated above.

If the variation of flux is too rapid or too weak to be registered by a galvanometer or if it has to be amplified, the electric fitting must be effected on a circuit as schematically shown by Fig. 10, wherein by 29 is marked the cell, by 30 is indicated a normal type of amplifier, whereas the resistances and the source of electric power of the circuit are marked with the normal signs of electrotecnic diagrams.

In this case also the remark already made several times must be repeated, that the source of direct current may be replaced by a source of alternative current.

The mechanic fitting of the substance is effected, in the previous cases, between two conductors of any form whatsoever, placed on an insulating support on which the sensitive substance is spread so as to be supported in contact with the conductors.

For instance, two forms of embodiment of the mechanic link, are illustrated by Figs. 11 and 12. In Fig. 11 is indicated by 31 the support of insulating material, by 32 the element of sensitive substance spread on the aforesaid support; on the element 32 are in contact by pressure the terminals 33 and 34 of the detecting circuit, pressed on the sensitive substance by means of the screws 35 and 36. The electric connection between conductors and sensitive substance may be obtained also by means of springs or by welding or by equivalent systems.

Fig. 12 shows on the contrary, the fitting system in which the connection is obtained by means of conductive wire turns.

In this case the sensitive substance 37 is spread on the insulating support 38. On the same support are fitted two conductive windings, fixed in 39 and 40 respectively on the insulating support and wound on same so as to ensure the contact on the sensitive substance and brought, after an equal number of contact turns, to the leading-out terminals 41 and 42 respectively.

The types of mechanic fitting aforedescribed, are suitable for such measurements in which the substance is thin and is hit uniformly by the radiation.

If the substance is not hit uniformly by the radiation and it is desired to determine point by point the intensity of same radiation, for instance, in order to detect and reconstruct the image projected on the sensitive layer (night detector), then the electric and mechanic fitting must be provided as described hereafter.

The thin layer, obviously having such a thickness that the radiation may reach also the deepest part, is spread on an insulating support through which passes a plurality of conductors placed as shown by Fig. 13, in which is diagrammatically indicated the sole suport, without the sensitive substance.

The support indicated by 43 is crossed by three types of conductors indicated schematically by $a$, $b$ and $c$.

The conductors of type $a$ pass through the insulating support from its superior surface, on which is supposed to be spread the sensitive substance, to the inferior surface, being insulated among themselves. The conductors of type $c$ are also in contact with the sensitive substance and are connected by rows, in parallel, transversally without reaching the inferior face of the support.

Symmetrically in respect of the conductors $c$, i. e. reaching the inferior face and transversally connected, are the conductors of type $b$.

Therefore, the sensitive substance is in contact with the conductors $a$ and $c$, as aforesaid.

On the face opposed to that on which the sensitive substance is spread, i. e. on the face reached by the conductors of types $a$ and $b$, runs a commutator which may be mechanic (metallic) or electronic (beam of electrons).

Figure 14 represents schematically the electric arrangement of the sensitive substance in the case the distribution of the intensity of the radiation transversely to a beam thereof is to be determined. This radiation is indicated by means of undulated arrows. The sensitive substance is interposed in that section of the beam whereof the distribution of the intensity is to be determined. The substance is spread on an insulating support (not shown) in a thin layer 44 so as to be passed through by the radiation. The surface opposite to the surface whereon the radiation strikes is in contact with the conductors $a$ and $c$. The latter are connected in parallel to the galvanometer 48 or other apparatus to detect a variation of electric current while the conductors $a$ pass singly through the insulating support ending at the surface opposite to that whereon the sensitive layer is spread. On this surface a conductor bridge 46, 47 connects at least one of the conductors 6 and a suitable mechanical device displaces the bridge in such a way as to cover all the surface to be explored, that is, all the surface of the insulating support located at the side opposite to that whereon the sensitive substance is spread. The conductors b are connected to the measuring apparatus 48 through the electric generator 49. By displacing the bridge 46, 47 over the whole surface, the measuring apparatus will record the intensity of the current which passes in the portion of the layer 44 located between the conductors a connected by the bridge and the adjacent conductors c. Should the substance not discover variations of conductivity, apparatus 48 will not record valuable variations of flux. These variations will be recorded when bridge 46, 47 inserts in the circuit zones wherein the conductivity of layer 44 varies. Since, according to the properties of the substance, for every variation of conductivity there corresponds a variation of the intensity of the incident flux, corresponding to the wave length to which the substance is sensitive. The variations of current recorded by instrument 48 when bridge 46, 47 moves, reproduce the variations of intensity of the radiation intercepted in the plan whereon the sensitive layer 44 is located. The conductors 6 may be replaced by a connection of bridge 46, 47 through the controlling stem 45, by means of an electric conductor which connects points 50 and 51 of the schematic drawing.

Figure 15 represents another case analogous to that illustrated in Fig. 14. The difference consists in that the exploration of the surface of the insulating support opposite to that whereon the sensitive layer 44 is spread is made in the place of a bridge 46, 47 by means of a well known electronic apparatus used in oscillographs and in television tubes. At a proper distance from the insulating support, an electron gun 52 is arranged in such a manner as to direct the beam against the surface of the support whereto arrive the ends of the conductors a and b. By means of electrostatic plates 54 of other analogous means the electron beam is deviated in such a manner that the end thereof is caused to strike successively all the points of the insulating support surface which are opposite to the points wherein the conductivity of the sensitive substance is to be determined. When the width of the electronic beam 53 is set in such a manner, that the beam strikes at least one end of a conductor a and one end of a conductor b, the electrons will be distributed among the two conductors according to the resistance of the two circuits a–44–c–h and b–i. Through the conductors f and g the amplifier 55 is connected to two points of the resistances i and h. It follows that removing the end of the electron beam 53 by means of the deviators 54 and causing that end to strike successively all points of the support surface opposite the points of the substance 44, the resistivity of which is to be explored, if a variation of resistivity occurs, the amplifier 55 will record a variation of the tension in the conductors f and g. Such arrangement is important as it permits the insertion of the apparatus in the usual television apparatus. As a matter of fact, by inserting the electron gun 52, the deviator device 54 and the amplifier 55 in the normal television apparatus in place of the image detecting tube (iconoscope or the like) the tube which reproduces the image would reproduce the distribution of the conductivity upon the surface of the sensitive layer 44. If the latter is located in the focus of an objective reproducing an image carried by the radiations of the wave length whereby the layer 44 is sensitive, the receiving television tube would reproduce the image in wave length perceptible by human eye.

A variation of the apparatus and method illustrated in Fig. 15 is illustrated in Fig. 16. This variation is based upon the property of the sensitive substance of assuming differences of tension among the zones subjected to different intensity of radiation on the part of the wave length range to which it is sensitive. Subdividing layer 44 in portions limited and insulated to each other each of which being in touch with at least one conductor a, the desired effect is obtained when the thickness of the portions of layer is greater than the path travelled by the radiation inside the sensitive substance. By covering layer 44 with a conductive transparent layer, which replaces the conductors c in the electric scheme of Figures 14 and 15, the amplifier 55 will detect the variation of the tension difference caused by the different incidence of the radiation on the elements of the sensitive layer with displacements of the incidence point of electronic beam 53 led by the guiding device 54. For a better understanding of this particular effect, in Fig. 17 is schematically illustrated the operation of the sensitive cell when the layer of the sensitive substance has a thickness greater than the path of the radiation inside the substance.

In Figures 17, 18 and 19 the sensitive cell is composed of a portion of substance located between two conductors; that facing the incident radiation indicated by undulated arrows has a thickness so small as to be transparent to the radiation or either it is made in the form of a net or a grating in such a manner as to permit the incident radiation to strike the substance. The conductor at the opposite side has any suitable thickness and it is on the side of the sensitive substance which is never struck nor effected by the incident radiation. By so acting, a difference of tension is generated between the two conductors which are in contact with the sensitive substance and the amount of the difference is in relationship with the intensity of radiation. Any suitable electric measuring instrument inserted between the two conductors is able to detect the effects of the radiation and to furnish a value which permits the measure of the intensity of the radiation which strikes the sensitive substance.

Fig. 17 represents the scheme for the insertion of any measuring instrument. Fig. 18 represents the scheme for measuring the variation in the course of time of the intensity of the radiation, through an electronic device as an amplifier, an oscilloscope or any device fit to reveal to the human senses a variation of electric tension in the course of time, for example, a microphonic element.

Fig. 19 illustrates the electric scheme for inserting two cells having a great thickness when it is desired to make a comparative measure instead of an absolute measure among the electromotive forces generated by the cells 55 and 57 in order to infer a comparative valuation among the intensities of the radiation striking the said cells. The variable resistances 59 and 60 serve as a comparative measure and the measuring instrument 58 of the electric current (voltmeter, amperemeter, galvanometer) serves to control that the circuit is kept in the calibration conditions. It is also possible to calibrate the instrument by means of the resistances 59 and 60 and to read on the instrument the comparative values of the electromotive forces generated by the incidence of the radiation on the cells 56 and 57.

The above is possible provided the conductor layers 63 and 64 and the portions of sensitive substance which are in touch therewith are neither irradiated nor effected by the radiation which has to be measured or by other ones which may obliterate the effect to be measured.

In all the aforedescribed electric circuits, it will be sufficient to cool, and protect, as above said, the substance, its insulating or conductive support and the conductors in immediate contact with the substance.

In the electric circuit having electronic commutation it is advisable that also the deflectors and the source of the beam of electrons be protected and cooled.

Such source will be nevertheless, generally warm, if thermic electrons are employed, and in this case the thermic radiations will have to be absorbed before they may disturb the sensitive substance.

Particularly, it may be suitable to employ instead of a thermic electrons source, a source of electrons photo-emitted by effect of a light-ray coming from the external medium of the apparatus and having a length of wave such as not to disturb the sensitive substance.

All the electric unit illustrated by Figs. 14, 15, 16, will have to be in vacuum.

This may be obtained also by putting all the unit in cool chambers of the diagrams illustrated by Figs. 2 to 6 and producing vacuum in them, in order to have in the vacuum also the optical part.

I claim:

1. An apparatus sensitive to electro-magnetical radiations of a wavelength greater than 6 microns comprising an optical system adapted to reproduce a real image by means of said radiations, a layer of a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, an insulating support, said layer being disposed on said insulating support in at least one portion, at least two sets of parallel conductors passing through said support and ending on different surfaces thereof, said conductors being disposed in such a manner that at least on the side of the surface covered with the sensitive substance their ends form a uniform mosaic so that each portion of the substance is in contact with at least one end of a conductor extending to each of said different surfaces and all the ends of the conductors of the several sets are in contact over said surface with at least a portion of the sensitive substance, an electrical circuit in which each of said insulated portions of said sensitive substance and the respective conductors are inserted, a device connected in said circuit for visually detecting the variations of the electrical state of the circuit, a chamber opaque to said radiations and containing said optical system and sensitive substance, and means for cooling said chamber.

2. An apparatus sensitive to electro-magnetical radiations of a wavelength greater than 6 microns comprising an optical system adapted to reproduce a real image by means of said radiations, a layer of a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, an insulating support, said layer being disposed on said insulating support in at least one portion, at least two sets of parallel conductors passing through said support and ending on different surfaces thereof, said conductors being disposed in such a manner that at least on the side of the surface covered with the sensitive substance their ends form a uniform mosaic so that each portion of the substance is in contact with at least one end of a conductor extending to each of said different surfaces and all the ends of the conductors of the several sets are in contact over said surface with at least a portion of the sensitive substance, a cooled, insulated and screened mechanical commutator connected to the ends of said conductors opposite to the ends extending to said sensitive substance, an electrical circuit connected to said commutator, a device connected to said electrical circuit for visually detecting the variations of the electrical state of the circuit when said commutator connects the electrical circuit successively to different zones of the layer of the sensitive substance, a chamber opaque to said radiations and containing said optical system and sensitive substance, and means for cooling said chamber.

3. An apparatus sensitive to electro-magnetical radiations of a wavelength greater than 6 microns comprising an optical system adapted to reproduce a real image by means of said radiations, a layer of a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, an insulating support, said layer being disposed on said insulating support in at least one portion, a cooled, insulated and screened mechanical commutator connected to said sensitive substance, an electrical circuit connected to said commutator, a device connected to said electrical circuit for visually detecting the variations of the electrical state of the circuit when said commutator connects the electrical circuit successively to different zones of the layer of the sensitive substance, a chamber opaque to said radiations and containing said optical system and sensitive substance, and means for cooling said chamber.

4. An apparatus sensitive to electro-magnetical radiations of a wavelength greater than 6 microns comprising an optical system adapted to reproduce a real image by means of said radiations, a layer of a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, an insulating support, said layer being disposed on said insulating support in at least one portion, at least two sets of parallel conductors passing through said support and ending on different surfaces thereof, said conductors being disposed in such a manner that at least on the side of the surface covered with the sensitive substance their ends form a uniform mosaic so that each portion of the substance is in contact with at least one end of a conductor extending to each of said different surfaces and all the ends of the conductors of the several sets are in contact over said surface with at least a portion of the sensitive substance, a cooled insulated and screened commutator consisting of a directed beam of electrons which strikes the surface of said support to which the ends of the conductors which are opposite to those in contact with the sensitive substance are led, an electrical circuit connected to said commutator, a device connected to said electrical circuit for visually detecting the variations of the electrical state of the circuit when said commutator connects the electrical circuit successively to different zones of the layer of the sensitive substance, a chamber opaque to said radiations and containing said optical system and sensitive substance, and means for cooling said chamber.

5. An apparatus sensitive to electro-magnetical radiations of a wavelength greater than 6 microns comprising an optical system adapted to reproduce a real image by means of said radiations, a layer of a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, an insulating support, said layer being disposed on said insulating support in at least one portion, a cooled insulated and screened commutator consisting of a directed beam of electrons which alternately connects different zones of the sensitive substance, an electrical circuit connected to said commutator, a device connected to said electrical circuit for visually detecting the variations of the electrical state of the circuit when said commutator connects the electrical circuit successively to different zones of the layer of the sensitive substance, a chamber opaque to said radiations and containing said optical system and sensitive substance, and means for cooling said chamber.

6. An apparatus sensitive to electro-magnetical radiations of a wavelength greater than 6 microns comprising an optical system adapted to reproduce a real image by means of said radiations, a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors field which is below the medium temperature, said sensitive substance being located in the path of said radiations, a chamber opaque to said radiations and containing said optical system and sensitive substance, and an electrical circuit composed of four resistances in bridge connections, one of said resistances being constituted by the sensitive substance, two other of said resistances having a predetermined value of from 0 to $\infty$ ohms and the fourth resistance having a value not lower than a tenth of the resistivity of the portion of the sensitive substance inserted in the bridge circuit, an energy source connected at a pair of opposite vertex of said bridge circuit, and a visual detecting device connected to the other opposite vertex of said bridge circuit.

7. An apparatus sensitive to electro-magnetical radiations of a wavelength greater than 6 microns comprising an optical system adapted to reproduce a real image by means of said radiations, first and second layers of a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, said sensitive substances being located in the path of said radiations, an electrical differential bridge circuit, in which said sensitive substances are inserted, a device connected in said circuit for visually comparing the two resistances of said sensitive substances produced by the two light fluxes striking the same, a chamber opaque to said radiations and containing said optical system and sensitive substances, and means for cooling said chamber.

8. An apparatus sensitive to electro-magnetical radiations of a wavelength greater than 6 microns and having a sensitive substance composed of a material selected from the group consisting of a metalloid element and a compound selected from the group consisting of a binary chemical compound of a metal and a binary chemical compound of a metalloid in which the curve of the resistivity has a first portion located in the zone of the low temperatures wherein the resistivity is substantially constant with increases in temperature, a second portion located in the temperature zone immediately below the room temperature wherein the resistivity decreases rapidly, with increases in temperature, and a third portion wherein the resistivity increases with increases in temperature with a course analogous to that of metallic conductors, said substance detecting a radiation of a determined wavelength band when utilized at a temperature comprised in the two first portions of the curve of the resistivity.

9. An apparatus sensitive to electro-magnetical radiations of a wavelength greater than 6 microns and having a sensitive substance composed of a material selected from the group consisting of a metalloid element and a compound selected from the group consisting of a binary chemical compound of a metal and a binary chemical compound of a metalloid, in which the curve of the resistivity shows a first portion located in the zone of the low temperatures wherein the resistivity is substantially constant with increases in temperature, a second portion located in the temperature zones immediately below the room temperature, wherein the resistivity rapidly decreases with increases in temperature and a third portion wherein the resistivity increases with increases in temperature with a course analogous to that of the metallic conductors, said first and second portions of the curve of the resistivity having their connecting point comprised in the temperature range between 50 and 150 degrees absolute, said substance being adapted to detect the radiation of determined wavelength band when utilized at a temperature comprised between 50 and 200 degrees absolute.

10. An apparatus sensitive to electro-magnetical radiations of a wavelength greater than 6 microns and having a sensitive substance composed of boron in an uncombined crystalline state, in which the curve of the resistivity shows a first portion located in the zone of the low temperatures wherein the resistivity is substantially constant with increases in temperature, a second portion located in the temperature zones immediately below the room temperature, wherein the resistivity rapidly decreases with increases in temperature and a third portion wherein the resistivity increases with increases in temperature with a course analogous to that of the metallic conductors, said first and second portions of the curve of the resistivity having their connecting point comprised in the temperature range between 50 and 150 degrees absolute, said substance being adapted to detect the radiation of determined wavelength band when utilized at a temperature comprised between 50 and 200 degrees absolute.

11. An apparatus sensitive to electro-magnetical radiations of a wavelength greater than 6 microns and having a sensitive substance composed of a mixture of an element of the fifth group of the periodic system of elements with an element of one of the two adjacent groups in a ratio of atom numbers comprised between $\frac{1}{2}:\frac{1}{2}$ and $\frac{2}{7}:\frac{5}{7}$, in which the curve of the resistivity shows a first portion located in the zone of the low temperatures wherein the resistivity is substantially constant with increases in temperature, a second portion located in the temperature zones immediately below the room temperature, wherein the resistivity rapidly decreases with increases in temperature and a third portion wherein the resistivity increases with increases in temperature with a course analogous to that of the metallic conductors, said first and second portions of the curve of the resistivity having their connecting point comprised in the temperature range between 50 and 150 degrees absolute, said substance being adapted to detect the radiation of determined wavelength band when utilized at a temperature comprised between 50 and 200 degrees absolute.

12. An apparatus sensitive to electro-magnetical radiations of a wavelength greater than 6 microns and having a sensitive substance composed of a mixture of arsenic and tin in a ratio of atom number comprised between $\frac{1}{2}:\frac{1}{2}$ and $\frac{2}{7}:\frac{5}{7}$ in which the curve of the resistivity shows a first portion located in the zone of the low temperatures wherein the resistivity is substantially constant with increases in temperature, a second portion located in the temperature zones immediately below the room temperature, wherein the resistivity rapidly decreases with increases in temperature and a third portion wherein the resistivity increases with increases in temperature with a course analogous to that of the metallic conductors, said first and second portions of the curve of the resistivity having their connecting point comprised in the temperature range between 50 and 300 degrees absolute, said substance being adapted to detect the radiation of determined wavelength band when utilized at a temperature comprised between 50 and 200 degrees absolute.

13. An apparatus sensitive to electro-magnetical radiations of a wavelength greater than 6 microns and having a sensitive substance composed of a mixture of arsenic and lead in a ratio of atom numbers comprised between $\frac{1}{2}:\frac{1}{2}$ and $\frac{2}{7}:\frac{5}{7}$, in which the curve of the resistivity shows a first portion located in the zone of the low temperatures wherein the resistivity is substantially constant with increases in temperature, a second portion located in the temperature zones immediately below the room temperature, wherein the resistivity rapidly decreases with increases in temperature and a third portion wherein the resistivity increases with increases in temperature with a course analogous to that of the metallic conductors, said first and second portions of the curve of the resistivity having their connecting point comprised in the temperature range between 50 and 150 degrees absolute, said substance being adapted to detect the radiation of determined wavelength band when utilized at a temperature comprised between 50 and 200 degrees absolute.

14. An apparatus sensitive to electro-magnetical radiations of a wavelength greater than 6 microns comprising an optical system adapted to reproduce a real image by means of said radiations, a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, said sensitive substance being located in the path of said radiations, a solid support, said sensitive substance being disposed on said support in the form of a layer of such thickness that the radiations directed thereon will pass through the same, a conducting material disposed on said support, an electrical circuit in which said sensitive substance and conducting material are inserted, a device connected in said circuit for visually detecting the variations of the electrical state of the circuit, a chamber opaque to said radiations and containing said optical system and sensitive substance, and means for cooling said chamber.

15. An apparatus sensitive to electro-magnetical radiations of a wavelength greater than 6 microns comprising an optical system adapted to reproduce a real image by means of said radiations, a layer of a sensitive substance composed of a material selected from the group consisting of a metalloid element and a compound selected from the group consisting of a binary chemical compound of a metal and a binary chemical compound of a metalloid in which the curve of the resistivity shows a first portion located in the zone of the low temperature wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, an insulating support, said layer being disposed on said insulating support in at least one portion, a conductor passing through said support to the supported surface of each insulated portion of said sensitive substance, an electrical circuit in which each of said insulated portions of said sensitive substance and the respective conductors are inserted, a device connected in said circuit for visually detecting the variations of the electrical state of the circuit, a chamber opaque to said radiations and containing said optical system and sensitive substance, and means for cooling said chamber.

16. A method for detecting and measuring electromagnetical radiations of a wavelength greater than 6 microns coming from bodies having a temperature below 500 absolute degrees and from photo-emitting substances kept in a state of inner motion with an average kinetic energy lower than that which corresponds to 500 absolute degrees comprising, reproducing by means of an optical system an image of the said bodies and photo-emitting substances on a sensitive solid substance, the optical system and the sensitive substance being contained in chambers with opaque walls, cooling the optical system, the sensitive substance and the chambers to a temperature below room temperature, the sensitive substance being composed of a material selected from the group consisting of a metalloid element and a compound selected from the group consisting of a binary chemical compound of a metal and a binary chemical compound of a metalloid in which the curve of the resistivity, as a function of the increasing temperature, in solid state shows a first portion located in the zone of the low temperatures wherein the resistivity is substantially constant with increase in temperature, a second portion located in the temperature zones immediately below the room temperature, wherein the resistivity rapidly decreases with increases in temperature and a third portion wherein the resistivity increases with increases in temperature with a course analogous to that of the metallic conductors, inserting the said sensitive substance in an electrical circuit adapted to visually detect the variations of the resistivity and the electromotive forces generated in the sensitive substance when the latter is struck by the radiations transmitting the image of the said bodies and the said photo-emitting substances.

17. A method for detecting and measuring electromagnetical radiations of a wavelength greater than 6 microns coming from bodies having a temperature below 500 absolute degrees and from photo-emitting substances kept in a state of inner motion with an average kinetic energy lower than that which corresponds to 500 absolute degrees comprising, reproducing by means of an optical system the image of the said bodies and photo-emitting substances on a sensitive solid substance, the optical system and the sensitive substance being contained in chambers with opaque walls, cooling the optical system, the sensitive substance and the chambers to a temperature comprised between 50 and 150 absolute degrees, the sensitive substance being composed of a material selected from the group consisting of a metalloid element and a compound selected from the group consisting of a binary chemical compound of a metal and a binary chemical compound of a metalloid in which the curve of the resistivity, as a function of the increasing temperature, in solid state shows a first portion located in the zone of the low temperatures wherein the resistivity is substantially constant with increase in temperature, a second portion located in the temperature zones immediately below the room temperature, wherein the resistivity rapidly decreases with increases in temperature and a third portion wherein the resistivity increases with increases of temperature with a course analogous to that of the metallic conductors, said first and second portion of the curve of the resistivity having their connecting point comprised in the temperature range of from 50 to 200 absolute degrees, inserting said sensitive substance in an electrical circuit adapted to visually detect the variations of the resistivity and the electromotive forces generated in the sensitive substance when the latter is struck by the radiations transmitting the image of the said bodies and the said photo-emitting substances.

18. A method for detecting and measuring electromagnetical radiations of a wavelength greater than 6 microns coming from bodies having a temperature below 500 absolute degrees and from photo-emitting substances kept in a state of inner motion with an average kinetic energy lower than that which corresponds to 500 absolute degrees comprising, reproducing by means of an optical system the image of the said bodies and photo-emitting substances on a sensitive substance, the optical system and the sensitive substance being contained in chambers with opaque walls, cooling the optical system, the sensitive substance and the chambers to a temperature comprised between 80 and 100 absolute degrees, the sensitive substance being composed of a material selected from the group consisting of a metalloid element and a compound selected from the group consisting of a binary chemical compound of a metal and a binary chemical compound of a metalloid in which the curve of the resistivity, as a function of the increasing temperature, in solid state shows a first portion located in the zone of the low temperatures wherein the resistivity is substantially constant with increases in temperature, a second portion located in the temperature zones immediately below the room temperature, wherein the resistivity rapidly decreases with increases in temperature and a third portion wherein the temperature increases with increases of temperature with a course analogous to that of the metallic conductors, said first and second portion of the curve of the resistivity having their connecting point below 150 absolute degrees and above the temperature to which the sensitive substance and the optical system is kept, inserting said sensitive substance in an electrical circuit adapted to visually detect the variations of the resistivity and the electromotive forces generated in the sensitive substance when the latter is struck by the radiations transmitting the image of the said bodies and the said photo-emitting substances.

19. A method for detecting and measuring electromagnetical radiations of a wavelength greater than 6 microns coming from the bodies having a temperature below 500 absolute degrees and from photo-emitting substances kept in a state of inner motion with an average kinetic energy lower than that which corresponds to 500 absolute degrees comprising reproducing by means of an optical system an image of the said bodies and photo-emitting substances on sensitive substance, the optical system and the sensitive substance being contained in chambers with opaque walls, cooling the optical system, the sensitive substance and the chambers to a temperature below the room temperature, the sensitive substance being composed of a material selected from the group consisting of a metalloid element and a compound selected from the group consisting of a binary chemical compound of a metal and a binary chemical compound of a metalloid in which the curve of the resistivity, as a function of the increasing temperature, in solid state shows a first portion located in the zone of the low temperatures wherein the resistivity is substantially constant with increase in temperature, a second portion located in the temperature zones immediately below the room temperature wherein the resistivity rapidly decreases with increases in temperature and a third portion wherein the resistivity increases with increases of temperature with a course analogous to that of the metallic conductors, inserting the said sensitive substance in an electrical circuit adapted to visually detect the variation of the resistivity and the electromotive forces generated in the sensitive substances when the latter is struck by the radiations transmitting the image of the said bodies and the said photo-emitting substances, and unequally illuminating said sensitive substance by means of the said optical system at the two points where said substance is inserted in the electrical circuit whereby said sensitive substance generates the electrical current for operating the said optical system.

GIOVANNI TOMMASI.

References Cited in the file of this patent

UNITED STATES PATENTS

| Number | Name | Date |
|---|---|---|
| 1,379,166 | Case | May 24, 1921 |
| 2,032,588 | Miller, Jr. | Mar. 3, 1936 |
| 2,120,765 | Orvin | June 14, 1938 |
| 2,189,122 | Andrews | Feb. 6, 1940 |
| 2,334,085 | Graves et al. | Nov. 9, 1943 |
| 2,423,885 | Hammond | July 15, 1947 |